United States Patent Office 2,858,230
Patented Oct. 28, 1958

2,858,230

METHOD OF MAKING PIGMENT AND PRODUCTS THEREOF

Alexander F. Knoll, Westfield, and Loren C. Hurd, Basking Ridge, N. J.; Eleanor Holbrook Hurd, executrix of said Loren C. Hurd, deceased, assignors to Metals Disintegrating Company, Inc., Union City, N. J., a corporation of New Jersey No Drawing. Application June 26, 1957
Serial No. 668,037

7 Claims. (Cl. 106—277)

This invention relates to methods of making a relatively stable wet pigment, or paste, composed essentially of non-leafing aluminum flake powder pigment dispersed in water. The invention further relates to methods of making relatively stable aqueous base paints, or similar coating material, containing aluminum flake powder as a pigment. In addition, the invention relates to the products of these methods. By "non-leafing," as that term is used herein and in the appended claims, is meant aluminum flake powder pigments the capacity, if any, of which to leaf in a paint vehicle is not sufficient to produce in the resulting paint or coating the characteristic specular brightness produced by the leading type aluminum pigments. These non-leafing aluminum pigments have many well known uses for industrial and for decorative purposes. Herein, and in the appended claims, the term paint is used in a broad sense to denote mixtures of pigment and carrier or vehicle, the mixtures being of the type used on, or applied to, surfaces to create therein a coating or a decorative effect.

The general problem to which this invention is directed arises from the well known fact that aluminum flake powder pigment has been, with a few exceptions, limited in use to pigment systems which are essentially non-aqueous in character. In addition, when the known pastes or wet pigments of commerce have been manufactured by ball milling, or by other means of attrition, in the presence of a liquid it has heretofore been necessary to use non-aqueous liquids. The reason for the use of non-aqueous systems in connection with aluminum flake powder pigments is the fact that in the presence of water aluminum flake particles undergo rapid change, presumably due to oxidation, with the result that the usefulness of the flake as a pigment is destroyed in a relatively short time. Therefore few aqueous paint or coating systems which contain aluminum flake as a pigment have been usable in commerce. Where, for some reason, an aluminum flake pigment must be applied in a carrier or vehicle containing water it has been customary to avoid adding the aluminum flake to the system until immediately prior to its use and, thereafter, to complete the painting or coating operation as quickly as possible to minimize depreciation of the pigment.

To meet this problem we have devised methods of making a relatively stable wet pigment or paste which is composed essentially of a water vehicle or menstrum in which is dispersed aluminum flake powder pigment. This product of our invention is relatively stable, as such, and when used to pigment an aqueous base paint, produces a relatively stable paint in which the aluminum flakes do not undergo substantial deterioration over long periods.

In accordance with our invention aluminum metal is fed, in suitably sized pieces, to an attrition process in which the metal is subjected to mechanical forces which reduce the metal to the desired aluminum flake form, there being present suitable amounts of a lubricant such as stearic acid, stearates, oleic acid, lard or other grease which is necessarily present to promote the attrition or grinding of the aluminum metal. During this attrition process the metal which is subject thereto is contacted with an aqueous solution containing available $PO_4$ ion furnished from a compound selected from the group consisting of phosphoric acid ($H_3PO_4$) and the ammonium, alkali metal, alkaline earth metal, zinc and magnesium salts thereof.

To obtain a pigment stability sufficient for most uses the amount of available phosphate ion should equal or exceed about 0.7% by weight of the metal pigment which is produced and the aqueous solution containing such ion should have a pH in the range of 1.5 to 11. The particular attrition forces selected for the practice of this invention will be governed by practical considerations. We prefer to conduct the attrition in a ball mill using the action of steel balls to produce the attrition. This is presently the most practical method because the aluminum pigment industry uses ball mills such as those indicated in the United States Patent No. 2,002,891 to Hall, as the instrumentality in producing aluminum flake from pieces of aluminum metal.

Relatively stable wet pigments may also be made in accordance with this invention by contacting previously produced aluminum flake pigment, whether it be of the leafing or non-leafing type, with an aqueous solution containing available $PO_4$ ion derived from the compounds above described and in the amount and at the relative acidity above described. In this case the method consists essentially of the step of contacting the aluminum flakes with such a solution for a time and thereafter, if desired, draining off such of the solution as is not desired in the final wet pigment. When leafing aluminum flake is thus treated its leafing properties are not retained and the result is a pigment of the non-leafing type. Where there is available the usual commercial aluminum flake pigment in paste form, the liquid portion of which is an organic vehicle, this product may be converted to a relatively stable wet pigment having an aqueous liquid portion by washing, or flushing, the organic vehicled paste with an aqueous solution of phosphate ion of the type above described until the organic vehicle has been, at least in large part, emulsified and removed, whereupon the aluminum flake remains in wet pigment form associated with the washing solution. Such washing procedures can be conducted either on the organic vehicled paste of commerce or may be more simply conducted immediately after the aluminum flake has been manufactured by milling it in contact with an organic vehicle, in the manner shown, for instance, in the aforesaid U. S. Patent 2,002,891. In the latter case the aluminum flake may be left in the milling enclosure, usually a ball mill, and while so located it may be flushed as aforesaid to remove the organic vehicle and substitute therefore the desired amount of aqueous vehicle. In the washing procedures just described it is preferable to add to the washing solution a surfactant such as for instance an alkyl phenol-ethylene oxide reaction product. The use of surfactant is preferred whenever the methods of this invention are practiced since it tends to assure, as is well known, a more uniform wetting of the particles by the aqueous solution.

We describe the wet pigments produced by the methods of this invention as relatively stable in contact with water to distinguish them from the heretofore known aluminum flake powder pigment which is, as aforesaid, highly unstable in contact with water. Generally when an aluminum flake powder pigment is placed in an aqueous vehicle such as, for instance, in water, or in aqueous emulsions in aqueous systems of the type widely used in paints such as acrylic, polyvinyl acetate, butadiene-styrene, casein, alkyd and copolymers dispersions, the result is a violent reaction, usually delayed from a few hours to as high as one or two weeks, which reaction results in the virtual destruction of the aluminum flake as a pigment and usually in its reduction to a discolored pulp or mass. This reaction is accompanied by the evolution of gas which often reaches explosive levels if the paint is, as usual, packaged in a sealed container. On the contrary the wet pigments which are the product of this invention are relatively stable in the sense that either, as such, or as a pigment in an aqueous paint vehicle, they do not undergo gross degradation of their pigment properties such as reflectivity and coverage and maintain the physical integrity of the component aluminum flakes over a period of months. They therefore possess sufficient stability to permit of commercially significant time intervals between manufacture and use and thus to permit of distribution and sale including a relatively long shelf life. The wet pigments produced in accordance with this invention may, in some instances, steadily give off small volumes of gas for extended periods after manufacture and thereafter may, in some instances, apparently absorb gas from the atmosphere. While these phenomena would seem to indicate that the aluminum flake powder retains some surface activity these phenomena have not hampered commercial use or resulted in any gross degradation of the quality of the pigment.

The reasons why the methods of this invention result in a wet pigment the aluminum flake content of which is relatively stable in the presence of water are not fully understood by us. Attempts to produce such pigments using phosphite ion or compounds of pyrophosphoric acid have resulted in a pigment unstable in the presence of water. The source of the $PO_4$ ion is of importance. For instance where a heavy metal of the type such as forms an active electrolytic couple with aluminum is a substantial part of the salt used to furnish the $PO_4$ ion the desired result is not reached, presumably because of the presence of the active electrolytic couple. It is also true that when organic phosphates, such as triethyl and diethyl phosphate are used as a source of the $PO_4$ ion the desired result is apparently not readily achieved. The complete drying, i. e., removal of water, from the relatively stable aluminum flake pigments produced in accordance with the methods of this invention, appears substantially to impair or destroy the stability of the pigment to the point that upon re-exposure to water a reaction occurs which affects the usefulness of the aluminum flake as a pigment.

We prefer to practice the methods of this invention under conditions where the amount of $PO_4$ ion available in aqueous solution exceeds about 1.5% by weight of the metal pigment contacted by the solution and, further, where the pH of the solution is within a range of about 2 to 9.5. It is under these conditions that the greatest relative stability of the resultant product is to be observed. We have also found that when our relatively stable aluminum flake pigments form a part of a water containing paint the best results are obtained when the acidity of the paint is less than that equivalent to a pH of 10. As the available $PO_4$ ion is increased in amount in the solution there comes a point, probably at about 6% by weight of the metal being contacted, beyond which no further benefit is apparent, but additional amounts are not harmful to stability.

Various examples illustrative of the preferred practice of this invention and of various facts herein above recited are as follows:

Example 1.—A paint was made in the following manner: 350 grams of a commercial leafing aluminum flake powder pigment was thoroughly mixed with an aqueous solution composed of 300 grams of water and 13.2 grams of diammonium hydrogen phosphate, said solution having a pH of 9.2. The mixture thus formed was added to 1 liter of a paint vehicle consisting of an aqueuos acrylic latex emulsion. The paint thus formed was placed in a sealed can. At the end of nine months, the paint had undergone no apparent degradation of its good initial paint qualities.

Example 2.—A paint of the same composition and similarly formed as in the case of Example 1, with the exception that the aqueous solution with which the metal pigment was mixed contained 1.8 grams of a commercial surfactant (Triton CF10), was placed in a sealed can, stored for nine months and then inspected. The initial good properties of the paint had been retained despite the nine months of storage.

Example 3.—A paint was formed by mixing 44 grams of a commercial leafing aluminum flake powder pigment with a vehicle containing 75 cc. of water, 1.7 grams of diammonium hydrogen phosphate and 250 cc. of an aqueous polyvinyl acetate latex emulsion, the said vehicle having a pH of about 5.8. Over a period of eight months, this paint was inspected monthly for any change in its satisfactory initial appearance, light reflectance and painting properties. No change was observed.

Example 4.—A thick unbrushable coating mixture was formed by mixing 200 grams of commercial leafing aluminum flake powder pigment with an aqueous solution containing 300 cc. of water and 13.2 grams of diammonium hydrogen phosphate and mixing the mixture thus formed with an aqueous asphalt emulsion. The final mixture was thinned with water and stored in a sealed can for three weeks at the end of which time no change in the original properties of the mixture could be observed. It was theen used to form a portion of a roof coating on a commercial building.

Example 5.—A paint was formed by mixing 44 grams of commercial leafing aluminum flake powder pigment to a mixture containing 75 cc. of water, 1 cc. of phosphoric acid (85% glacial) and 250 cc. of an aqueous polyvinyl acetate latex emulsion. This mixture had a pH of 2.6. The satisfactory paint thus formed was stored in a sealed can for two months. At the end of that period, it still retained its original paint properties.

Example 6.—A wet aluminum paste pigment was formed by thoroughly mixing 500 grams of a commercial leafing aluminum flake powder pigment with a solution containing 15 grams of diammonium hydrogen phosphate and 5 grams of a commercial surfactant dissolved in 700 cc. of water (Triton X–100), and having a pH of 9.2. The wet aluminum paste pigment thus formed was used to pigment the following:

(a) An aqueous emulsion called Geon Latex No. 352 made by the B. F. Goodrich Company;
(b) An aqueous emulsion called Latex X–2566 made by the Dow Chemical Company;
(c) A commercial aqueous emulsion of vinyl acetate copolymer;
(d) A commercial aqueous emulsion of vinyl acetate latex;
(e) A commercial aqueous emulsion of a hydrocarbon resin;
(f) A commercial aqueous emulsion of polystyrene latex;
(g) A commercial aqueous emulsion of alkyd resin.

All of the paints thus formed remained stable and at the end of three months had the same appearance, light reflectance (after painting) and other painting properties as did the paints when originally formed.

Example 7.—In a 24-inch diameter ball mill 6 inches wide, containing 185 pounds of 3/16 to 3/8 inch steel balls there was charged 2000 grams of 100 mesh aluminum grain metal, 37 grams of a lubricant, stearic acid, and 3000 cc's. of an aqueous solution containing 57 grams of diammonium hydrogen phosphate. The mill was rotated at 65 R. P. M. for six hours during which time an additional 2000 cc. of water was added. The milled contents were then washed out with water onto a filter and excess liquid was removed. The resulting wet aluminum flake powder pigment consisted of approximately 50 percent of metal and residual lubricant, the balance being the aqueous menstrum. Portions of this wet aluminum flake pigment were used, with excellent results, as pigments in aqueous paint vehicles. A portion of the wet pigment was stored in a sealed container. After six months of storage, no degradation of the pigment was observed.

*Example 8.*—A commercial aluminum paste pigment containing essentially of about 75 percent by weight of leafing aluminum flake powder pigment and mineral spirits was treated as follows. 50 grams of this paste was dispersed in an aqueous solution containing diammonium hydrogen phosphate equal to 3 percent by weight of the metallic content of the paste and about 1½ percent by weight of a commercial surfactant. The mixture thus formed was filtered and washed twice with the filtrate. The resultant filter cake was then washed with a fresh portion of aqueous solution of the type initially used. The resultant wet aluminum flake pigment was in the form of a paste containing approximately 40 percent by weight of metal and possessed excellent pigment characteristics which did not undergo degradation after five months of storage.

*Example 9.*—The following wet aluminum flake pigments were made by mixing the indicated aqueous solutions with a commercial leafing aluminum flake powder pigment. The thus produced pigment was then stored and its characteristics observed.

(*a*) Water containing no available phosphate ion and about ½ percent by weight of a surfactant mixed with aluminum flake powder. The pigment reacted violently within a week with the development of considerable heat and the production of a dry unusable sinter containing aluminum and aluminum oxide.

(*b*) Water containing available phosphate ion in an amount equal to 0.35 percent by weight of the aluminum and about ½ percent by weight of a surfactant was mixed with aluminum flake powder. The pigment reacted violently within two weeks to produce an unusable sinter containing aluminum and aluminum oxide.

(*c*) A pigment similar to that of (*b*), but made by using an aqueous solution containing available phosphate ion in an amount equal to about 0.50 percent by weight of the aluminum, failed in the manner described under (*b*).

(*d*) When a pigment similar to that of (*b*) was made using an aqueous solution containing available phosphate ion in an amount equal to about 0.7 percent by weight of the aluminum, the pigment retained its initial pigment characteristics for seven weeks of storage after which time failure occurred in the manner described under (*b*).

*Example 10.*—A wet aluminum flake pigment prepared by mixing 25 grams of commercial aluminum flake powder pigment with 50 cc. of a solution containing available phosphate ion equal to 2.1% by weight of the aluminum (derived from the presence of diammonium hydrogen phosphate) had excellent pigment properties which did not change after seven months of shelf storage at room temperature.

*Example 11.*—A wet aluminum flake pigment prepared by mixing 25 grams of commercial aluminum flake powder pigment with 50 cc. of a solution containing available phosphate ion equal to 5.5% by weight of the aluminum (derived from the presence of sodium dihydrogen phosphate) had excellent pigment properties which did not change after seven months of shelf storage at room temperature.

*Example 12.*—A wet aluminum flake pigment prepared by mixing 25 grams of commercial aluminum flake powder pigment with 50 cc. of a solution containing available phosphate equal to 3.2% by weight of the aluminum (derived from the presence of phosphoric acid) had excellent pigment properties which did not change after seven months of shelf storage at room temperature.

Wet aluminum flake powder pigments were made by first preparing aqueous solutions of phosphoric acid of a pH of 1.5 to 3, thereafter adding to these solutions zinc carbonate or calcium carbonate or magnesium oxide and then mixing the solutions with commercial aluminum flake powder pigments. The wet pigments thus formed had relative stabilities such as those indicated above when phosphoric acid, instead of the metallic phosphates, were used as the source of the available $PO_4$ ion. However, when salts of copper or lead were used a relatively rapid reaction took place.

Illustrative of the relative stability of the wet aluminum flake powder pigments made in accordance with this invention is a paste prepared by contacting 40 grams of commercial aluminum flake powder pigments with 60 cc. of water containing available phosphate ion, derived from ammonium dihydrogen phosphate, in an amount equal to about 0.9% by weight of the aluminum. The paste thus formed was placed in a container and stored for one month at temperatures of 120 to 140 degrees Fahrenheit. Despite such storage at elevated temperature, the properties of the paste were unimparied. A paint made by mixing the paste with an aqueous acrylic latex emulsion produced, when applied to a surface, a reflectance of 57%.

Having thus described our invention, we claim:

1. The process of making wet aluminum pigment containing non-leafing aluminum flake particles in contact with water which comprises the attrition of aluminum to form aluminum flake particles in the presence of a lubricant while contacting said metal, and the particles so formed, with an aqueous solution consisting essentially of available $PO_4$ ion in an amount of at least about 0.7 percent by weight of the weight of the metal, said $PO_4$ ion being furnished in said aqueous solution from a compound selected from the group consisting of phosphoric acid and ammonium, alkali metal, alkaline earth metal, zinc and magnesium salts of said acid, the said aqueous solution having an acidity within the range indicated by a pH of about 1.5 to about 11.

2. The process of claim 1 characterized by the fact that the $PO_4$ ion is available in said solution in an amount greater than about 1.5 percent of the weight of the metal.

3. The method of making wet aluminum flake powder pigment relatively stable in the presence of water which comprises contacting aluminum flake with an aqueous solution consisting essentially of a compound selected from the group consisting of phosphoric acid and the ammonium, alkali, alkaline earth, zinc and magnesium salts of said acid, said compound being present in amount sufficient to form in said solution an available $PO_4$ ion content equal to at least about 0.7 percent by weight of the aluminum flake powder pigment, said solution having pH of about 1.5 to about 11.

4. The process of claim 3 characterized by the fact that the $PO_4$ ion is available in said solution in an amount greater than about 1.5 percent by weight of the metal and the pH of said solution is about 2 to 9.5.

5. The process of claim 3 characterized by the fact that the aluminum flake contacted is a part of an organic vehicled mass and the said contacting step comprises washing organic vehicle from said mass by the use of said solution of $PO_4$ ion.

6. A relatively stable non-leafing wet aluminum flake powder pigment composed essentially of aluminum flake powder and water said pigment having been made by contacting aluminum flake with an aqueous solution consisting essentially of a compound selected from the group consisting of phosphoric acid and ammonium, alkali metal, alkaline earth metal, zinc and magnesium salts of that acid.

7. A paint composed of a water containing vehicle and containing as a pigment a relatively stable non-leafing wet aluminum flake powder pigment composed essentially of aluminum flake powder and water, said pigment having been made by contacting aluminum flake with an aqueous solution consisting essentially of a compound selected from the group consisting of phosphoric acid and ammonium, alkali metal, alkaline earth metal, zinc and magnesium salts of that acid.

References Cited in the file of this patent

UNITED STATES PATENTS

| | | |
|---|---|---|
| 2,309,377 | Babcock | Jan. 26, 1943 |
| 2,393,731 | Babcock | Jan. 29, 1946 |

UNITED STATES PATENT OFFICE
CERTIFICATE OF CORRECTION

Patent No. 2,858,230            October 28, 1958

Alexander F. Knoll et al.

It is hereby certified that error appears in the above numbered patent requiring correction and that the said Letters Patent should read as corrected below.

In the grant, lines 4 and 5, for "of Union City, New Jersey," read -- of Union, New Jersey, --; in the heading to the printed specification, line 7, for "Union City, N. J., read -- Union, N. J., --; column 1, line 28, for "leading" read -- leafing --; column 3, line 9, for "copolymers" read -- copolymer --; column 4, line 40, for "theen" read -- then --.

Signed and sealed this 14th day of July 1959.

(SEAL)
Attest:

KARL H. AXLINE
Attesting Officer

ROBERT C. WATSON
Commissioner of Patents